(12) United States Patent
Nomura et al.

(10) Patent No.: US 11,247,292 B2
(45) Date of Patent: Feb. 15, 2022

(54) RESISTANCE SPOT WELDING METHOD AND RESISTANCE SPOT WELDING APPARATUS

(71) Applicant: TOYOTA JIDOSHA KABUSHIKI KAISHA, Toyota (JP)

(72) Inventors: Koji Nomura, Toyota (JP); Shuhei Ogura, Nagakute (JP); Atsushi Kawakita, Miyoshi (JP); Naoya Kato, Toyota (JP); Toru Hioki, Miyoshi (JP); Kenji Fukushima, Kiyosu (JP); Shun Kato, Ichinomiya (JP); Takashi Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 403 days.

(21) Appl. No.: 16/294,086

(22) Filed: Mar. 6, 2019

(65) Prior Publication Data
US 2019/0275606 A1    Sep. 12, 2019

(30) Foreign Application Priority Data
Mar. 9, 2018    (JP) .............................. JP2018-042534

(51) Int. Cl.
*B23K 11/11* (2006.01)
*B23K 11/31* (2006.01)
*B23K 11/30* (2006.01)

(52) U.S. Cl.
CPC ......... *B23K 11/115* (2013.01); *B23K 11/3009* (2013.01); *B23K 11/314* (2013.01)

(58) Field of Classification Search
CPC ... B23K 11/115; B23K 11/253; B23K 11/255; B23K 11/258; B23K 11/3009; B23K 11/314
(Continued)

(56) References Cited

U.S. PATENT DOCUMENTS

| 4,503,312 A * | 3/1985 | Nakata ................ B23K 11/255 219/110 |
| 2011/0089146 A1* | 4/2011 | Takahashi ............ B23K 11/115 219/91.2 |

(Continued)

FOREIGN PATENT DOCUMENTS

| CN | 105189014 A | 12/2015 |
| CN | 106363289 A | 2/2017 |

(Continued)

*Primary Examiner* — Dana Ross
*Assistant Examiner* — Ket D Dang
(74) *Attorney, Agent, or Firm* — Sughrue Mion, PLLC (57) ABSTRACT

Provided are a method and an apparatus for resistance spot welding in which preliminary current application is executed and then main welding is executed in accordance with master patterns of various parameters obtained during the preliminary current application. The main welding is executed under welding conditions of the master patterns, and whether a welding abnormality has occurred and whether the welding abnormality is likely to occur are determined. When the welding abnormality is likely to occur, the welding conditions for the main welding are corrected so as to prevent the welding abnormality. When the welding abnormality is unlikely to occur, the welding conditions for the main welding are corrected so as to match the master patterns.

8 Claims, 4 Drawing Sheets

(58) Field of Classification Search
USPC ........ 219/86.41, 86.51, 86.7, 109, 110, 91.2, 219/87, 86.1, 86.24, 117.1; 700/245; 228/212
See application file for complete search history.

(56) References Cited

U.S. PATENT DOCUMENTS

| | | |
|---|---|---|
| 2016/0008913 A1 | 1/2016 | Okita et al. |
| 2016/0008914 A1* | 1/2016 | Okita ................... B23K 11/115 219/78.01 |
| 2017/0113295 A1* | 4/2017 | Sawanishi ............ B23K 11/115 |
| 2018/0056434 A1* | 3/2018 | Aoki ..................... B23K 11/315 |
| 2018/0281102 A1 | 10/2018 | Sawanishi et al. |

FOREIGN PATENT DOCUMENTS

| | | |
|---|---|---|
| CN | 107530818 A | 1/2018 |
| JP | 7-096376 A | 4/1995 |
| JP | 5582277 B1 | 7/2014 |
| WO | 2016/174842 A1 | 11/2016 |

\* cited by examiner

RESISTANCE SPOT WELDING METHOD AND RESISTANCE SPOT WELDING APPARATUS

INCORPORATION BY REFERENCE

The disclosure of Japanese Patent Application No. 2018-042534 filed on Mar. 9, 2018 including the specification, drawings and abstract is incorporated herein by reference in its entirety.

BACKGROUND

1. Technical Field

The present disclosure relates to a resistance spot welding method and a resistance spot welding apparatus. In particular, the present disclosure relates to improvement on a technique of executing preliminary current application and then executing main welding in accordance with master patterns of various parameters obtained during the preliminary current application.

2. Description of Related Art

Resistance spot welding is conventionally used as means for joining together a plurality of metal sheets in manufacturing a body frame of a vehicle. In resistance spot welding, a current is applied to a workpiece (a plurality of metal sheets) held between a pair of electrodes, and Joule heat generated due to the electrical resistance of the workpiece itself etc. is used to melt and join together the metal sheets.

A technique of resistance spot welding, such as the one disclosed in Japanese Patent No. 5582277, is known in which preliminary current application (referred to as test welding in Japanese Patent No. 5582277) is executed prior to main welding, and the main welding is executed while control parameters are adjusted based on changes in various parameters during the preliminary current application. Specifically, in Japanese Patent No. 5582277, during the preliminary current application, changes over time in an amount of instantaneous heat generation are calculated from electrical properties between electrodes by which an appropriate weld nugget is formed, and the calculated changes are stored. Based on these changes over time in the amount of instantaneous heat generation, a current application pattern is divided into a plurality of steps, and a target value for changes over time in the amount of instantaneous heat generation for each step is stored. In the main welding, resistance spot welding is started with reference to a curve of the changes over time in the amount of instantaneous heat generation having been stored as the target values. When the actual amount of changes over time in the amount of instantaneous heat generation deviates from the target curve of changes over time in any of the steps, the control parameters including a welding current value are adjusted during the remaining current application time based on that deviation.

SUMMARY

When resistance spot welding has been executed many times, an increase in the diameters of leading ends of electrodes due to wearing causes a decrease in the density of heat generation in a welding area during the main welding. Even when the amount of changes over time in the amount of instantaneous heat generation in the welding area as a whole does not deviate from the target curve of changes over time, such a decrease in the density of heat generation in the welding area may lead to a failure to secure an appropriate size of a molten part (an appropriate diameter of a weld nugget) before the main welding ends. Thus, a sufficient level of welding accuracy may not be achieved by the mode of control in which the main welding is performed based on the amount of changes over time in the amount of instantaneous heat generation that is specified with reference to the curve of changes over time in the amount of instantaneous heat generation having been stored as target values.

The present disclosure provides a resistance spot welding method and a resistance spot welding apparatus by which a sufficient level of welding accuracy can be achieved when preliminary current application is executed and then main welding is executed.

A first aspect of the present disclosure relates to a resistance spot welding method in which a workpiece formed by a plurality of metal sheets placed on top of one another is held between a pair of electrodes, and the metal sheets are melted and joined together by applying a current between the electrodes. This resistance spot welding method includes: acquiring information on the workpiece, and executing preliminary current application under a welding condition that is set based on the acquired information; measuring an execution state during the preliminary current application, and based on the execution state, setting a master pattern of a welding condition for main welding; executing the main welding under the welding condition of the master pattern, and when a current application time in the main welding is within a predetermined time, determining whether a welding abnormality has occurred; when the welding abnormality has not occurred, determining whether the welding abnormality is likely to occur; when the welding abnormality is likely to occur, continuing current application after correcting the welding condition for the main welding so as to prevent the welding abnormality; when the welding abnormality is unlikely to occur, continuing current application after correcting the welding condition for the main welding so as to match the set master pattern; and when the welding abnormality has occurred, changing the welding condition to a preset abnormality-response welding condition, and notifying occurrence of the welding abnormality.

According to these specifications, the preliminary current application is executed under the welding condition according to the information on the workpiece, and the master pattern of the welding condition under which an appropriate molten part can be produced is set. In the main welding, welding is executed under the welding condition of the master pattern, and whether the welding abnormality has occurred and whether the welding abnormality is likely to occur are determined. The welding abnormality here refers to, for example, occurrence of expulsion (scattering of molten metal). When the welding abnormality has not occurred but is likely to occur, current application is continued after the welding condition for the main welding is corrected so as to prevent the welding abnormality. When the welding abnormality has not occurred nor is likely to occur, current application is continued after the welding condition for the main welding is corrected so as to match the master pattern. When the welding abnormality has occurred, the main welding is executed under the preset abnormality-response welding condition, and the occurrence of the welding abnormality is notified. It is possible to secure an appropriate size of a molten part (an appropriate diameter of a weld nugget) and achieve a sufficient level of welding accuracy, regardless of the amount of wearing of the electrodes, by thus correcting the welding condition in the course of welding according to whether the welding abnormality is likely to occur.

During execution of the main welding, a determination action of determining whether a melting amount of the metal sheets has reached a predetermined amount as a target may be performed, and when the melting amount of the metal sheets has not reached the predetermined amount at a point in time when the current application time in the main welding has reached a set welding end time in the master pattern, a welding prolongation process of continuing current application in the main welding may be performed.

When the metal sheets are slow to melt for some reason, and the melting amount thereof has not reached the predetermined amount as a target despite the set welding end time having been reached, current application in the main welding is continued. Thus, an appropriate size of a molten part (an appropriate diameter of a weld nugget) can be secured, and a sufficient level of welding accuracy can be achieved.

When the melting amount of the metal sheets has not reached the predetermined amount at a point in time when the current application time in the main welding has reached a predetermined time beyond the set welding end time, the main welding may be forcibly ended and occurrence of the welding abnormality may be notified.

When the metal sheets are slow to melt for some reason, and the melting amount thereof has not reached the predetermined amount as a target despite the predetermined time beyond the set welding end time having been reached, the main welding is forcibly ended and the occurrence of the welding abnormality is notified. Thus, it is possible to avoid a situation where the main welding is continued for a long time without producing a sufficient melting amount of the metal sheets, and to prompt a worker to check on the workpiece.

In the above aspect, the execution state during the preliminary current application may be a pressure applied by the electrodes to the workpiece, an electrode displacement between the electrodes, and an electrical resistance between the electrodes.

In the above aspect, the welding abnormality may be expulsion occurring during the welding. When the applied pressure is below an expulsion-determining threshold value, or when the electrode displacement is above an expulsion-determining threshold value, or when the electrical resistance is above an expulsion-determining threshold value, it may be determined that the welding abnormality has occurred. When the applied pressure is below an expulsion likelihood-determining threshold value, or when the electrode displacement is above an expulsion likelihood-determining threshold value, or when the electrical resistance is above an expulsion likelihood-determining threshold value, it may be determined that the welding abnormality is likely to occur.

A second aspect of the present disclosure relates to a resistance spot welding apparatus that has a pair of electrodes between which a workpiece formed by a plurality of metal sheets placed on top of one another is held, and that melts and joins together the metal sheets by applying a current between the electrodes holding the workpiece. The resistance spot welding apparatus of the second aspect of the present disclosure includes: a control device configured to acquire information on the workpiece, and to execute preliminary current application under a welding condition that is set based on the information on the workpiece; a measurement device configured to measure an execution state during the preliminary current application; and a notification device configured to notify occurrence of a welding abnormality when the welding abnormality has occurred. The control device registers a master pattern of a welding condition for main welding based on the execution state measured by the measurement device, and executes the main welding under the welding condition of the master pattern. Moreover, the control device measures a current application time in the main welding, and when the current application time in the main welding is within a predetermined time, determines whether the welding abnormality has occurred and whether the welding abnormality is likely to occur, and when the welding abnormality is likely to occur, corrects the welding condition for the main welding so as to prevent the welding abnormality, and when the welding abnormality is unlikely to occur, corrects the welding condition for the main welding so as to match the set master pattern, and when the welding abnormality has occurred, changes the welding condition to a preset abnormality-response welding condition.

As with the case of the above-described resistance spot welding method, this resistance spot welding apparatus can also secure an appropriate size of a molten part (an appropriate diameter of a weld nugget) and achieve a sufficient level of welding accuracy, regardless of the amount of wearing of the electrodes, by correcting the welding condition in the course of welding according to whether the welding abnormality is likely to occur.

In the above aspect, the measurement device may include an applied pressure measurement device configured to measure a pressure applied by the electrodes to the workpiece, an electrode displacement measurement device configured to measure an electrode displacement between the electrodes, a voltage measurement device configured to measure a voltage across the electrodes, and a current measurement device configured to measure a welding current flowing between the electrodes. The execution state during the preliminary current application may be the applied pressure, the electrode displacement, and an electrical resistance between the electrodes that is calculated based on the voltage and the welding current, during execution of the preliminary current application.

In the above aspect, the welding abnormality may be expulsion occurring during the welding. When the applied pressure is below an expulsion-determining threshold value, or when the electrode displacement is above an expulsion-determining threshold value, or when the electrical resistance is above an expulsion-determining threshold value, the control device may determine that the welding abnormality has occurred. When the applied pressure is below an expulsion likelihood-determining threshold value, or when the electrode displacement is above an expulsion likelihood-determining threshold value, or when the electrical resistance is above an expulsion likelihood-determining threshold value, the control device may determine that the welding abnormality is likely to occur.

In the present disclosure, the preliminary current application is executed and then the main welding is executed in accordance with master patterns of various parameters obtained during the preliminary current application. When a welding abnormality has not occurred during the main welding, whether the welding abnormality is likely to occur is determined. When the welding abnormality is likely to occur, current application is continued after the welding condition for the main welding is corrected so as to prevent the welding abnormality. When the welding abnormality is unlikely to occur, current application is continued after the welding condition for the main welding is corrected so as to match the set master pattern. It is possible to secure an appropriate size of a molten part (an appropriate diameter of a weld nugget) and achieve a sufficient level of welding accuracy, regardless of the amount of wearing of the electrodes, by thus correcting the welding condition in the course of welding according to whether the welding abnormality is likely to occur.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure will be described below based on the drawings. In this embodiment, a case where the present disclosure is applied as a resistance spot welding method and a resistance spot welding apparatus for welding together two aluminum sheet materials will be described.

Configuration of Resistance Spot Welding Apparatus

Figure 1:
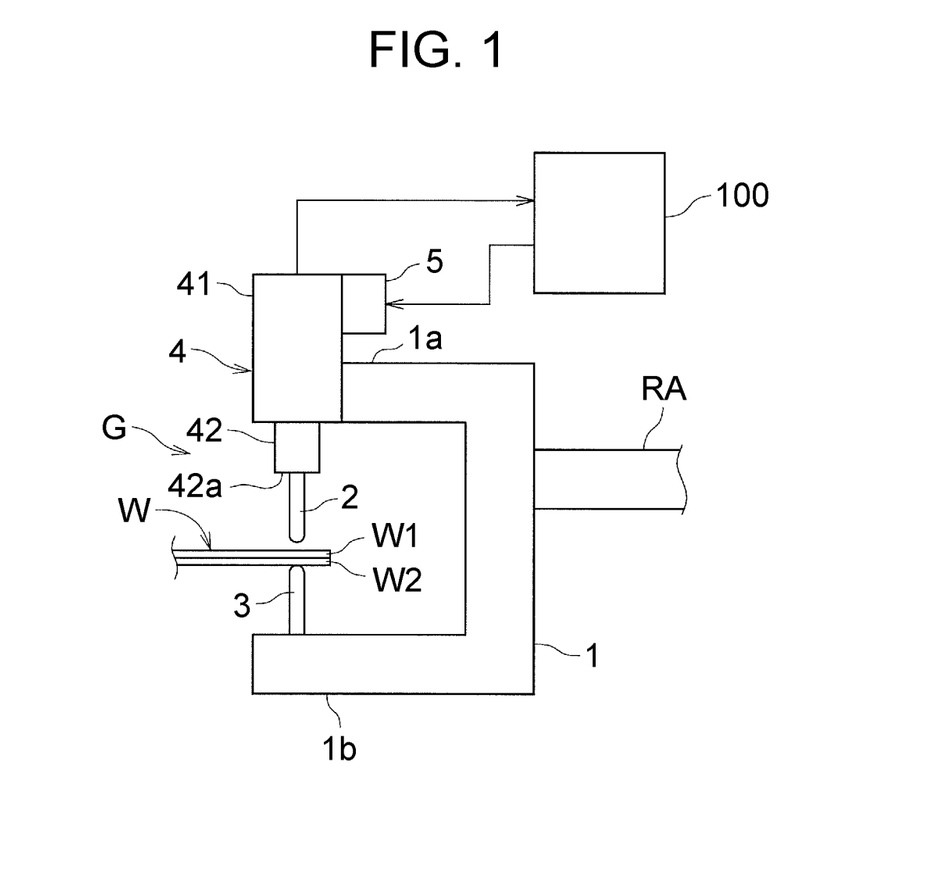
FIG. 1 is a schematic configuration view showing a spot welding gun of a resistance spot welding apparatus according to an embodiment.

FIG. 1 is a schematic configuration view showing a spot welding gun G of the resistance spot welding apparatus used for the resistance spot welding method according to the embodiment.

The spot welding gun G includes, as main components: an upper electrode 2 that is mounted on an upper part 1a of a gun main body 1 held by a robot arm RA; a lower electrode 3 mounted on a lower part 1b of the gun main body 1; an electrically operated upper electrode lifting device (hereinafter referred to simply as an electrode lifting device) 4 that holds and moves up and down the upper electrode 2; and a current adjustment device 5 that adjusts a value of a current (a value of a welding current) passed between the upper electrode 2 and the lower electrode 3. In FIG. 1, reference signs W1, W2 denote aluminum sheet materials, and the aluminum sheet materials W1, W2 constitute a workpiece W.

As shown in FIG. 1, the gun main body 1 has the lower electrode 3 provided upright on an upper surface of the lower part 1b. The electrode lifting device 4 is mounted at a leading end of the upper part 1a of the gun main body 1.

The electrode lifting device 4 includes a servomotor 41 that is mounted at the leading end of the upper part 1a of the gun main body 1, and a lifting member 42 that is coupled to a driving shaft (not shown) of the servomotor 41, and the upper electrode 2 is mounted at a lower end 42a of the lifting member 42. The electrode lifting device 4 can adjust a pressure applied to the workpiece W held between the upper electrode 2 and the lower electrode 3, by activating the servomotor 41 according to an applied pressure command signal from a control device 100 to be described later and moving the lifting member 42 up and down by the servomotor 41.

The current adjustment device 5 adjusts the value of the current passed between the upper electrode 2 and the lower electrode 3 according to a current command signal transmitted from the control device 100. A commonly known device, for example, a device including a variable resistor or a converter, is adopted as the current adjustment device 5.

Control Device

Next, the control device 100 of the resistance spot welding apparatus will be described. In resistance spot welding executed by the resistance spot welding apparatus according to the embodiment, first, preliminary current application is performed on the workpiece W, and master patterns of welding conditions under which an appropriate molten part (a weld nugget of a predetermined diameter) can be secured are acquired, and these master patterns are registered. In main welding, resistance spot welding is executed under the welding conditions of the master patterns. In this embodiment, for each of the preliminary current application and the main welding, initial current application is performed for a predetermined period, and then current application is suspended for a predetermined period (an interval is interposed) before main current application is performed. The initial current application is executed, for example, to remove or reduce an oxide film (a film with high electrical resistance), if any, on surfaces of the aluminum sheet materials W1, W2, and to thereby allow the aluminum sheet materials W1, W2 to melt easily during the main current application. The main current application is current application for melting and joining together the aluminum sheet materials W1, W2, and the welding current for the main current application is set to a higher value than the welding current for the initial current application.

Figure 2:
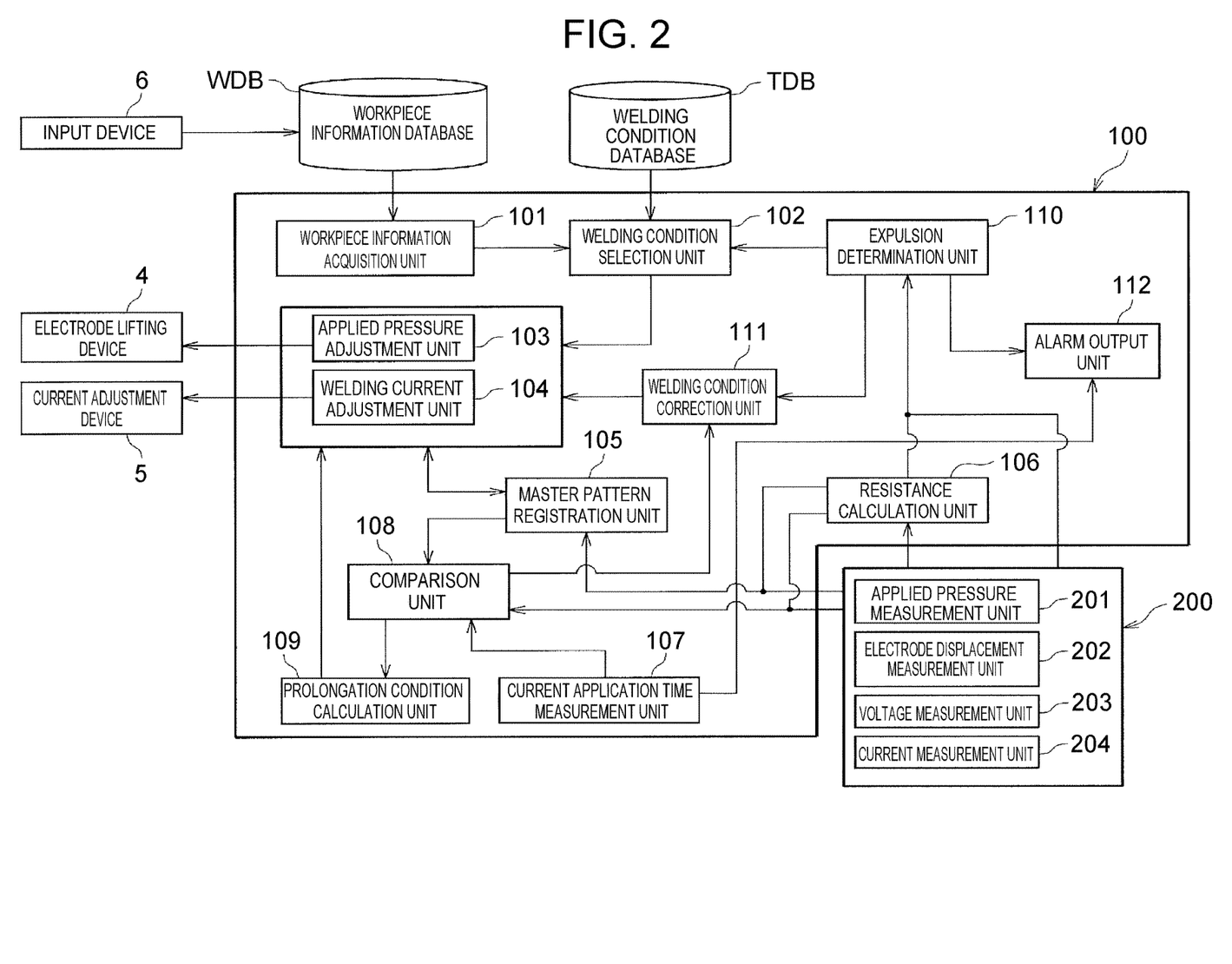
FIG. 2 is a control block diagram of the resistance spot welding apparatus.

FIG. 2 is a control block diagram of the control device 100 of the resistance spot welding apparatus. The control device 100 includes a read only memory (ROM), a random access memory (RAM), an input-output interface, etc. around a central processing unit (CPU; not shown).

The control device 100 includes a workpiece information acquisition unit 101 and a welding condition selection unit 102.

A workpiece information database WDB storing information on a plurality of types of workpieces W is connected to the control device 100, and the workpiece information acquisition unit 101 acquires information on a specific workpiece W from the workpiece information database WDB. The workpiece information database WDB stores information on a plurality of types of workpieces W input from an input device 6 that is operated by a worker. Examples of the information on the workpiece W include a combination of the material, the plate thickness, the number of sheets stacked (plate combination), etc. of the workpiece W. Specifically, pieces of information on all types of workpieces W that can come down a vehicle body manufacturing line are input in advance from the input device 6 into the workpiece information database WDB, and these pieces of information are stored in the workpiece information database WDB. The workpiece information acquisition unit 101 recognizes the workpiece W coming down the vehicle body manufacturing line (e.g., by reading information of a tag etc. attached to the workpiece W), and acquires (extracts) information on the workpiece W that matches the recognized workpiece W from the workpiece information database WDB.

Further, a welding condition database TDB storing welding conditions according to the type of the workpiece W is connected to the control device 100, and the welding condition selection unit 102 acquires specific welding conditions from the welding condition database TDB. The welding condition database TDB stores a plurality of welding conditions according to the type of the workpiece W. Examples of the welding conditions include a welding current value and a pressure applied to the workpiece W according to the type of the workpiece W. Specifically, a welding current value and an applied pressure by which a predetermined diameter of a weld nugget can be secured without causing expulsion (scattering of molten metal) during welding are obtained by experiment according to the type of the workpiece W, and the relationship between the type of the workpiece W and the welding current value and the applied pressure is stored in the welding condition database TDB in advance. Thus, the welding conditions (information on the welding current value, the applied pressure, etc.) according to all types of workpieces W that can come down the vehicle body manufacturing line are stored in the welding condition database TDB in advance. The welding condition selection unit 102 acquires (extracts), from the welding condition database TDB, the welding conditions corresponding to the type of the workpiece W that is information transmitted from the workpiece information acquisition unit 101.

The control device 100 further includes an applied pressure adjustment unit 103 and a welding current adjustment unit 104.

During the preliminary current application, the applied pressure adjustment unit 103 transmits, to the electrode lifting device 4, an applied pressure command signal according to the welding condition (the condition of the applied pressure) selected by the welding condition selection unit 102. During the preliminary current application, the welding current adjustment unit 104 transmits, to the current adjustment device 5, a current command signal according to the welding condition (the condition of the welding current value) selected by the welding condition selection unit 102.

Having the above functions, the applied pressure adjustment unit 103 and the welding current adjustment unit 104 constitute a preliminary current application execution unit as termed in the present disclosure.

Moreover, the applied pressure adjustment unit 103 transmits an applied pressure command signal to the electrode lifting device 4 during the main welding, and the welding current adjustment unit 104 transmits a current command signal to the current adjustment device 5 during the main welding, in accordance with a change pattern of the welding current and a change pattern of the applied pressure that are registered in a master pattern registration unit 105 to be described later. Specific control of the main welding will be described later.

Having also the above functions, the applied pressure adjustment unit 103 and the welding current adjustment unit 104 also constitute a main welding execution unit as termed in the present disclosure.

The control device 100 further includes the master pattern registration unit 105. While the preliminary current application is executed, the master pattern registration unit 105 creates and registers ideal change patterns of the welding current, the applied pressure, etc. by which a welding nugget of an appropriate size can be secured. Moreover, the master pattern registration unit 105 measures or calculates each of an electrode displacement, a voltage, an electrical resistance, etc. while the preliminary current application is executed, and registers the results as master patterns. In short, the master pattern registration unit 105 measures an execution state during the preliminary current application and registers the results as the master patterns. For this purpose, an applied pressure measurement unit 201, an electrode displacement measurement unit 202, a voltage measurement unit 203, and a current measurement unit 204 are connected to the control device 100.

The applied pressure measurement unit 201 measures the pressure applied by the electrodes 2, 3 to the workpiece W, and is formed, for example, by a load cell that is housed inside the electrode lifting device 4. When the aluminum sheet materials W1, W2 expand as they melt during execution of the main current application, a reaction force against the pressure applied by the electrodes 2, 3 is generated in the aluminum sheet materials W1, W2, so that the applied pressure measured by the applied pressure measurement unit 201 is obtained as a high value. Thus, it is possible to determine whether the aluminum sheet materials W1, W2 have melted to a predetermined amount (target melting amount) based on changes in the applied pressure measured by the applied pressure measurement unit 201 (in the case where a power transmission system is not configured to be reversely rotated by the reaction force).

The electrode displacement measurement unit 202 is housed inside the electrode lifting device 4, and is formed by an encoder that measures a lifting position of the upper electrode 2 by detecting a rotation angle position of an output shaft of the servomotor 41. In the case where the power transmission system includes a ball screw etc., when the aluminum sheet materials W1, W2 expand as they melt, a reaction force against the pressure applied by the electrodes 2, 3 is generated in the aluminum sheet materials W1, W2 as described above. Since this reaction force acts as a force that moves the upper electrode 2 upward, it is possible to determine whether the aluminum sheet materials W1, W2 have melted to the predetermined amount (target melting amount) by detecting the rotation angle position of the output shaft of the servomotor 41 and using this rotation angle position as a basis.

The voltage measurement unit 203 detects a voltage (potential difference) across the electrodes 2, 3. The current measurement unit 204 detects a value of an actual welding current between the electrodes 2, 3. Since the configurations of the voltage measurement unit 203 and the current measurement unit 204 are publicly known, the description thereof will be omitted here.

Having the above functions, the applied pressure measurement unit 201, the electrode displacement measurement unit 202, the voltage measurement unit 203, and the current measurement unit 204 constitute a measurement unit 200 as termed in the present disclosure.

The control device 100 further includes a resistance calculation unit 106. A voltage value measured by the voltage measurement unit 203 and a current value measured by the current measurement unit 204 are input into the resistance calculation unit 106, and the resistance calculation unit 106 calculates an electrical resistance by dividing the voltage value by the current value.

The control device 100 further includes a current application time measurement unit 107, a comparison unit 108, and a prolongation condition calculation unit 109.

The current application time measurement unit 107 measures a current application time (a current application time that has elapsed) from the start of the main current application in the main welding. The comparison unit 108 compares respective target values of the electrical resistance, the applied pressure, and the electrode displacement with the actual electrical resistance, applied pressure, and electrode displacement, to determine whether the aluminum sheet materials W1, W2 have melted to the predetermined target melting amount. If the aluminum sheet materials W1, W2 have not melted to the predetermined target melting amount despite the current application time measured by the current application time measurement unit 107 having reached a predetermined time (a set welding end time in the master pattern), the prolongation condition calculation unit 109 transmits a welding prolongation command signal to the applied pressure adjustment unit 103 and the welding current adjustment unit 104 to continue the main current application.

The control device 100 further includes an expulsion determination unit (welding abnormality determination unit) 110 and a welding condition correction unit 111.

The expulsion determination unit 110 determines whether expulsion has occurred and whether expulsion is likely to occur based on variation tendencies of the applied pressure, the electrode displacement, and the electrical resistance. Specifically, an expulsion-determining threshold value, and an expulsion likelihood-determining threshold value that is a value smaller than the expulsion-determining threshold value by a predetermined amount (a smaller value as an absolute value), are set for each of the variation tendencies of the applied pressure, the electrode displacement, and the electrical resistance. When at least one of the variation tendencies of the applied pressure, the electrode displacement, and the electrical resistance exceeds the expulsion-determining threshold value, it is determined that expulsion has occurred. Specifically, when expulsion has occurred, the applied pressure tends to decrease while the electrode displacement and the electrical resistance tend to increase. Therefore, when the actual applied pressure is below the expulsion-determining threshold value, or when the actual electrode displacement is above the expulsion-determining threshold value, or when the actual electrical resistance is above the expulsion-determining threshold value, it is determined that expulsion has occurred. When none of the variation tendencies of the applied pressure, the electrode displacement, and the electrical resistance exceeds the expulsion-determining threshold value, but at least one of the variation tendencies of the applied pressure, the electrode displacement, and the electrical resistance exceeds the expulsion likelihood-determining threshold value, it is determined that expulsion is likely to occur. Specifically, when the actual applied pressure is below the expulsion likelihood-determining threshold value, or when the actual electrode displacement is above the expulsion likelihood-determining threshold value, or when the actual electrical resistance is above the expulsion likelihood-determining threshold value, it is determined that expulsion is likely to occur.

The welding condition correction unit 111 corrects the welding conditions when it is determined that expulsion is likely to occur. That is, taking into account the likelihood that expulsion may eventually occur if the main current application is continued under the current welding conditions, the welding condition correction unit 111 corrects the applied pressure and the welding current value so as to be able to suppress occurrence of expulsion. Specifically, corrections are made so as to increase the applied pressure and reduce the welding current value.

The control device 100 further includes an alarm output unit (notification device) 112. When it is determined that expulsion has occurred based on at least one of the variation tendencies of the electrical resistance, the applied pressure, and the electrode displacement exceeding the expulsion-determining threshold value, the alarm output unit 112 notifies the worker of the occurrence of expulsion by displaying an alarm on an operation panel (not shown).

Resistance Spot Welding

Figure 3:
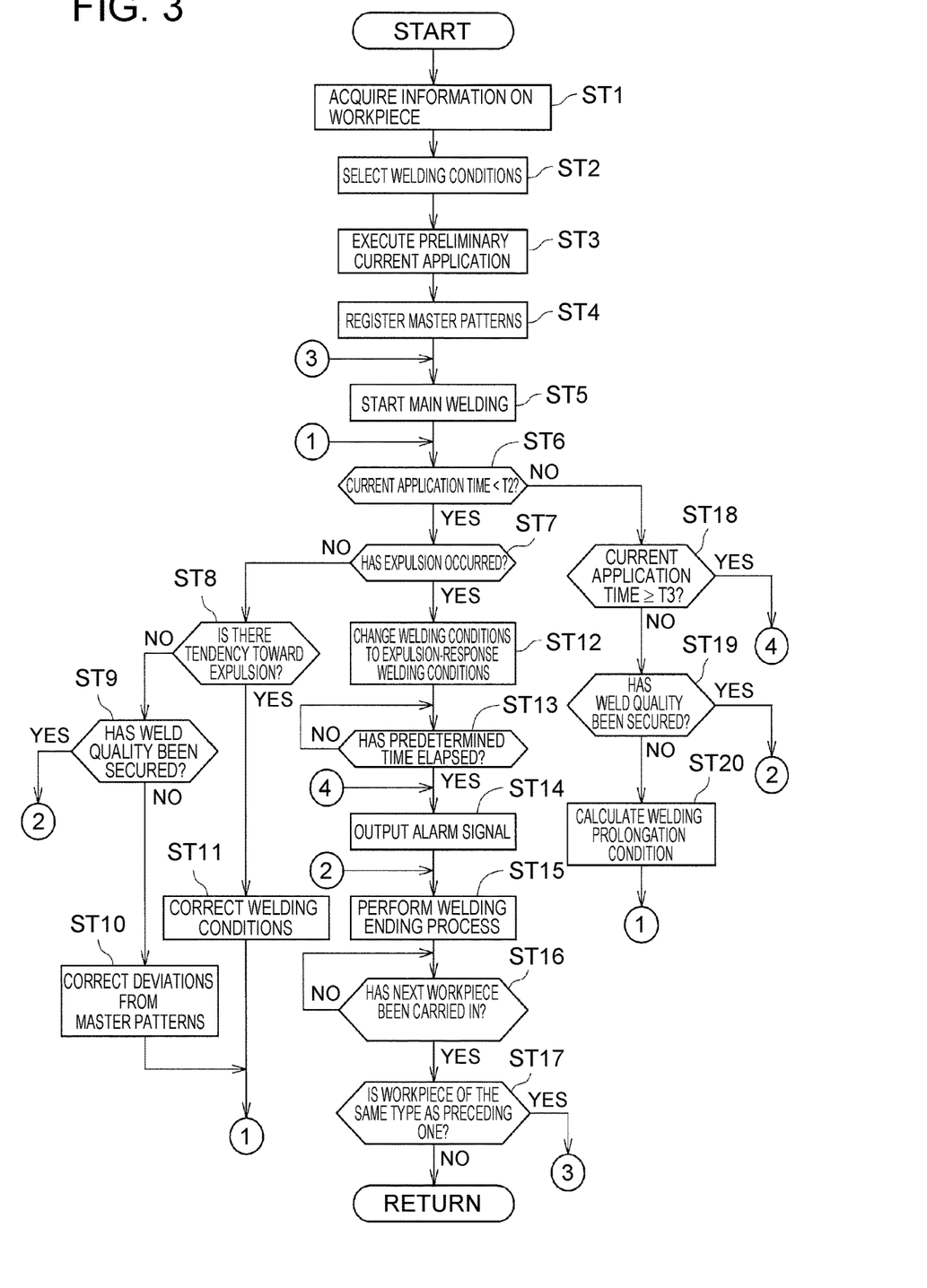
FIG. 3 is a flowchart showing a control procedure of resistance spot welding.

Next, resistance spot welding using the resistance spot welding apparatus configured as has been described above will be described. FIG. 3 is a flowchart showing a control procedure of resistance spot welding. This flowchart is executed repeatedly, once every predetermined time, while the resistance spot welding apparatus is in operation.

First, in step ST1, information on the workpiece W is acquired. As an information acquiring action, the workpiece information acquisition unit 101 recognizes the workpiece W coming down the vehicle body manufacturing line, and acquires information on the workpiece W that matches the recognized workpiece W from the workpiece information database WDB, as described above.

After the information on the workpiece W is acquired, the workflow moves to step ST2, in which welding conditions are selected. As a welding condition selecting action, the welding condition selection unit 102 acquires the welding conditions corresponding to the type of the workpiece W (the information transmitted from the workpiece information acquisition unit 101) from the welding condition database TDB as described above. As the welding conditions (the applied pressure and the welding current value) acquired here, a lower welding current value is selected to suppress occurrence of expulsion for a workpiece W that is made of a material having a higher electrical resistance due to the presence of an oxide film on a surface etc. (e.g., a hot-stamped material). A lower welding current value is selected to suppress occurrence of expulsion also for a workpiece W that has a smaller plate thickness. On the other hand, a higher applied pressure and a higher welding current value are selected to produce a predetermined target melting amount of the aluminum sheet materials W1, W2 for a workpiece W that has a larger number of sheets stacked.

After the welding conditions are thus selected, the workflow moves to step ST3, in which the preliminary current application is executed under these welding conditions. That is, the preliminary current application is executed after the pressure applied by the upper electrode 2 and the lower electrode 3 to the workpiece W and the value of the welding current applied between the upper electrode 2 and the lower electrode 3 are matched with the welding conditions. Specifically, an applied pressure command signal according to the applied pressure that is the selected welding condition is output from the applied pressure adjustment unit 103 to the electrode lifting device 4, and a current command signal according to the welding current value that is the selected welding condition is output from the welding current adjustment unit 104 to the current adjustment device 5, and thereby the preliminary current application is executed with these applied pressure and welding current value.

Figure 4:
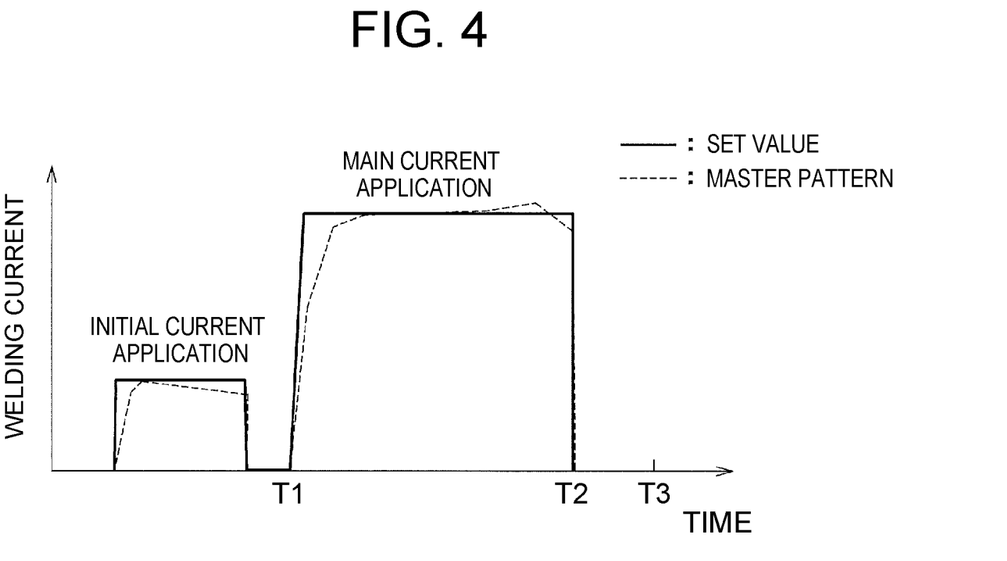
FIG. 4 is a view showing an example of changes in a welding current during preliminary current application.

FIG. 4 is a view showing an example of changes in the welding current during the preliminary current application. The solid line in FIG. 4 represents a change pattern of the welding current under the selected welding condition. The dashed line in FIG. 4 represents a change pattern of the welding current by which a weld nugget of an appropriate size can be actually secured when the preliminary current application is executed. This change pattern is a master pattern to be used in the main welding. The period from time T1 to time T2 in FIG. 4 is a current application time in the main current application that is set based on the master pattern. Also for the applied pressure (not shown), a master pattern to be used in the main welding is acquired in the same manner. Moreover, during the preliminary current application, the electrode displacement is measured by the electrode displacement measurement unit 202, the voltage is measured by the voltage measurement unit 203, and the electrical resistance is calculated by the resistance calculation unit 106, and master patterns are also thereby acquired.

In step ST4, the master patterns thus acquired are registered in the master pattern registration unit 105.

In step ST5, the main welding is executed under the welding conditions of the master patterns. That is, the main welding is executed after the pressure applied by the upper electrode 2 and the lower electrode 3 to the workpiece W and the value of the welding current applied between the upper electrode 2 and the lower electrode 3 are matched with the welding conditions of the master patterns. In conjunction with the start of the main welding, the current application time measurement unit 107 starts to measure the current application time (the current application time that has elapsed).

After the main welding is thus started, the workflow moves to step ST6, in which it is determined whether the main welding is in a state where the current application time in the main welding measured by the current application time measurement unit 107 has not yet reached the set welding end time in the master pattern (time T2 in FIG. 4) (current application time <T2).

Since the current application time in the main welding has not yet reached the set welding end time T2 shortly after the start of the main welding, a "Yes" answer is given in step ST6 and the workflow moves to step ST7. In step ST7, it is determined whether expulsion has occurred during the main welding. To determine whether expulsion has occurred, a threshold value for determining expulsion is set in advance for each of the applied pressure and the electrode displacement measured as described above and the electrical resistance calculated as described above, and these threshold values and the actual applied pressure, electrode displacement, and electrical resistance are compared. When even one of these parameters exceeds the threshold value, it is determined that expulsion has occurred.

When expulsion has not occurred and a "No" answer is given in step ST7, the workflow moves to step ST8, in which it is determined whether expulsion is likely to occur at the current point in time (whether there is a tendency toward expulsion). To determine whether there is a tendency toward expulsion, similarly, a threshold value for determining a tendency toward expulsion (a value that is smaller as an absolute value than the threshold value for determining expulsion) is set in advance for each of the applied pressure, the electrode displacement, and the electrical resistance, and these threshold values and the actual applied pressure, electrode displacement, and electrical resistance are compared. When even one of these parameters exceeds the threshold value, it is determined that there is a tendency toward expulsion.

When there is no tendency toward expulsion and a "No" answer is given in step ST8, the workflow moves to step ST9, in which it is determined whether the weld quality has been secured at the current point in time. This determination is a determination of whether the aluminum sheet materials W1, W2 are in a state where a weld nugget of an appropriate size can be secured if the main welding is ended at the current point in time.

Specifically, as described above, when the aluminum sheet materials W1, W2 expand as they melt, a reaction force against the pressure applied by the electrodes 2, 3 is generated in the aluminum sheet materials W1, W2, so that the applied pressure measured by the applied pressure measurement unit 201 is obtained as a high value. Thus, it is possible to determine whether the aluminum sheet materials W1, W2 have melted to the predetermined amount (target melting amount) based on changes in the applied pressure measured by the applied pressure measurement unit 201. Accordingly, when the applied pressure measured by the applied pressure measurement unit 201 has reached a predetermined value (a value set in advance based on experiment etc.), it can be determined that the aluminum sheet materials W1, W2 have melted to the predetermined amount (target melting amount) and are in a state where a weld nugget of an appropriate size can be secured (that the weld quality has been secured).

In the case where the upper electrode 2 is configured to be moved upward by the reaction force that is generated in the aluminum sheet materials W1, W2 by the aluminum sheet materials W1, W2 expanding as they melt, it is possible to determine whether the aluminum sheet materials W1, W2 have melted to the predetermined amount (target melting amount) by detecting the rotation angle position of the output shaft of the servomotor 41 and using this rotation angle position as a basis as described above. Accordingly, when the rotation angle position of the output shaft of the servomotor 41 detected by the electrode displacement measurement unit 202 has reached a predetermined value (a value set in advance based on experiment etc.), it can be determined that the aluminum sheet materials W1, W2 have melted to the predetermined amount (target melting amount) and are in a state where a weld nugget of an appropriate size can be secured (that the weld quality has been secured).

When the weld quality has not yet been secured and a "No" answer is given in step ST9, the workflow moves to step ST10, in which the current values of the parameters and the values of the parameters in the master patterns are compared, and the deviations of the current values of the parameters are corrected such that the welding conditions match the master patterns (correction of the welding conditions by the welding condition correction unit 111).

Unless expulsion occurs or a tendency toward expulsion arises, the actions in steps ST6, ST7, ST8, ST9, ST10 are repeated up to the set welding end time T2 while the parameters are thus corrected.

When no expulsion occurs or no tendency toward expulsion arises up to the set welding end time T2 and the weld quality has been secured, a "Yes" answer is given in step ST9 and the workflow moves to step ST15, in which a welding ending process is executed. That is, the current applied between the electrodes 2, 3 is stopped, and the pressure applied by the electrodes 2, 3 to the workpiece W is removed.

Thereafter, the workpiece W for which the main welding has ended is carried out, and another workpiece W that is the next object is carried in. In step ST16, it is determined whether the workpiece W that is the next object has been carried in. When the workpiece W that is the next object has been carried in and a "Yes" answer is given in step ST16, the workflow moves to step ST17, in which it is determined whether the workpiece W having been carried in is of the same type as the workpiece W that is the preceding object to be welded.

When these workpieces W are of the same type, a "Yes" answer is given in step ST17, and the main welding is executed on the workpiece W that is the current object, by using the welding conditions of the master patterns having been registered in step ST4 (step ST5). The main welding for the workpiece W is performed in the same manner as described above.

On the other hand, when the workpiece W that is the current object is of a different type from the workpiece W that is the preceding object, it is necessary to acquire and register master patterns for this new type of workpiece W. Therefore, a "No" answer is given in step ST17, and the master patterns are registered in accordance with the actions in step ST1 and the subsequent steps described above, and the main welding is performed by using the welding conditions of the registered master patterns (step ST5).

If a tendency toward expulsion arises before the set welding end time T2 is reached, and a "Yes" answer is given in step ST8, the workflow moves to step ST11, in which current application is continued after the welding conditions are corrected so as to prevent expulsion. Examples of corrections to the welding conditions made here include reducing the welding current value. That is, the amount of heat input into a molten part is reduced to thereby prevent expulsion. The amount of correction in this case is set based on experiment or simulation. For example, a larger amount of correction is set when the amounts of deviations of the actual applied pressure, electrode displacement, and electrical resistance from the threshold values are larger.

When there is a tendency toward expulsion, the actions in steps ST6, ST7, ST8, ST11 are repeated until this tendency toward expulsion disappears.

When expulsion occurs before the set welding end time T2 is reached and a "Yes" answer is given in step ST7, the workflow moves to step ST12, in which the welding conditions are changed to expulsion-response welding conditions. For example, the expulsion-response welding conditions are stored in the welding condition database TDB and read from the welding condition database TDB. Specifically, the welding current value is set to be lower and the applied pressure is set to be higher than the welding conditions in the master patterns. After the main welding is started under these expulsion-response welding conditions, it is determined in step ST13 whether a predetermined time has elapsed, and when this predetermined time has elapsed, the workflow moves to step ST14, in which an alarm signal is output from the alarm output unit 112. For example, an alarm is displayed on a monitor screen of the operation panel of the resistance spot welding apparatus to notify a worker of the occurrence of a welding abnormality (expulsion).

Thereafter, the workflow moves to step ST15, in which the welding ending process is executed. That is, the current applied between the electrodes 2, 3 is stopped, and the pressure applied from the electrodes 2, 3 to the workpiece W is removed. In this case, the workpiece W may have a weld defect and is therefore forwarded to an inspection process.

During execution of the main welding, when the current application time in the main welding has reached the set welding end time T2 without the weld quality having been secured (with a "No" answer continuously given in step ST9), a "No" answer is given in step ST6 and the workflow moves to step ST18. In step ST18, it is determined whether the main welding is in a state where the current application time in the main welding has reached a forced end time T3 beyond the set welding end time T2 (current application time T3). The forced end time T3 can be arbitrarily set.

When the current application time in the main welding has not reached the forced end time T3 (current application time <T3) and a "No" answer is given in step ST18, the workflow moves to step ST19, in which it is determined whether the weld quality has been secured at the current point in time, as in step ST9.

When the weld quality has not yet been secured and a "No" answer is given in step ST19, the workflow moves to step ST20, in which a welding prolongation condition is calculated to continue the main welding. As the welding prolongation condition, a time for which the main welding is to be continued is calculated, and a longer time is calculated as the deviation of the current melting amount of the aluminum sheet materials W1, W2 from the target melting amount is larger. After the welding prolongation condition is thus calculated, the workflow returns to step ST6, in which the main welding is continued. The welding prolongation time in this case may be uniformly set.

When a state where the weld quality has not been secured continues up to the forced end time T3 while the main welding is thus prolonged, the actions in steps ST6, ST18, ST19, ST20 are repeated.

When the weld quality has been secured before the forced end time T3 is reached, a "Yes" answer is given in step ST19 and the workflow moves to step ST15, in which the welding ending process and the subsequent actions described above are executed.

When the forced end time T3 is reached without the weld quality having been secured, a "Yes" answer is given in step ST18 and the workflow moves to step ST14, in which an alarm signal is output from the alarm output unit 112. In this case, the workpiece W may have a weld defect and is therefore forwarded to the inspection process.

The above actions are repeated once every predetermined time.

As such, of the above actions, the actions in steps ST1 to ST3 correspond to "acquiring information on the workpiece, and executing preliminary current application under a welding condition that is set based on the acquired information" as phrased in the present disclosure. The action in step ST4 corresponds to "measuring an execution state during the preliminary current application, and based on the execution state, setting a master pattern of a welding condition for main welding" as phrased in the present disclosure. The actions in steps ST5 to ST7 correspond to "executing the main welding under the welding condition of the master pattern, and when a current application time in the main welding is within a predetermined time, determining whether a welding abnormality has occurred" as phrased in the present disclosure. The action in step ST8 corresponds to "when the welding abnormality has not occurred, determining whether the welding abnormality is likely to occur" as phrased in the present disclosure. The action in step ST11 corresponds to "when the welding abnormality is likely to occur, continuing current application after correcting the welding condition for the main welding so as to prevent the welding abnormality" as phrased in the present disclosure. The actions in steps ST9, ST10 correspond to "when the welding abnormality is unlikely to occur, continuing current application after correcting the welding condition for the main welding so as to match the set master pattern" as phrased in the present disclosure. The actions in steps ST12 to ST14 correspond to "when the welding abnormality has occurred, changing the welding condition to a preset welding abnormality-response welding condition, and notifying occurrence of the welding abnormality" as phrased in the present disclosure.

As has been described above, in the embodiment, the preliminary current application is executed under the welding conditions according to the information on the workpiece W, and the master patterns of the welding conditions under which an appropriate molten part can be produced are set. In the main welding, welding is executed under the welding conditions of the master patterns, and whether expulsion (a welding abnormality) has occurred and whether expulsion is likely to occur are determined. When expulsion has not occurred but is likely to occur, current application is continued after the welding conditions for the main welding are corrected so as to prevent expulsion. When expulsion has not occurred nor is likely to occur, current application is continued after the welding conditions for the main welding are corrected so as to match the master patterns. It is possible to secure an appropriate size of a molten part (an appropriate diameter of a weld nugget) and achieve a sufficient level of welding accuracy, regardless of the amount of wearing of the electrodes, by thus correcting the welding conditions in the course of welding according to whether expulsion is likely to occur.

In the embodiment, when the melting amount of the aluminum sheet materials W1, W2 has not reached the predetermined amount at the point in time when the current application time in the main welding has reached the set welding end time T2 in the master pattern, the welding prolongation process of continuing current application in the main welding is performed. This also makes it possible to secure an appropriate size of a molten part (an appropriate diameter of a weld nugget) and achieve a sufficient level of welding accuracy.

In the embodiment, when the melting amount of the aluminum sheet materials W1, W2 has not reached the predetermined amount at the point in time when the current application time in the main welding has reached the predetermined time (forced end time) T3 beyond the set welding end time T2, the main welding is forcibly ended and an alarm signal is output. That is, when the aluminum sheet materials W1, W2 are slow to melt for some reason, and the melting amount thereof has not reached the predetermined amount despite the forced end time T3 beyond the set welding end time T2 having been reached, the main welding is forcibly ended and an alarm signal is output. Thus, it is possible to avoid a situation where the main welding is continued for a long time without producing a sufficient melting amount of the aluminum sheet materials W1, W2, and to prompt a worker to check on the workpiece W.

The above embodiment can also offer the following advantages:

In the case where an aluminum-based material and an iron-based material are put on the same vehicle body manufacturing line, the embodiment can secure an appropriate size of a molten part (an appropriate diameter of a weld nugget) for each of the materials, despite the difference in formation conditions of the molten part between the materials due to the difference in properties.

Since a current application path changes constantly as the material is softened or melted by a current applied thereto, the mode of control in which the main welding is performed based on the specified amount of changes over time in the amount of instantaneous heat generation (the mode of control of Japanese Patent No. 5582277) cannot achieve a sufficient level of welding accuracy. In contrast, the above embodiment can achieve a sufficient level of welding accuracy by correcting welding conditions, even when the current application path changes constantly.

Other Embodiments

The present disclosure is not limited to the above embodiment, and all modifications and applications included in the scope of the claims and a scope equivalent to the scope of the claims are possible.

For example, the case where the present disclosure is applied to resistance spot welding for welding together two aluminum sheet materials W1, W2 has been described in the above embodiment. However, the present disclosure is not limited to this example, and can also be applied to resistance spot welding for welding together three or more sheet materials. Sheet materials to which the resistance spot welding method of the present disclosure is applicable are not limited to aluminum but also include iron, magnesium, titanium, copper, etc. The present disclosure can also be applied to welding together different types of metals.

In the above embodiment, the initial current application is performed for a predetermined period for each of the preliminary current application and the main welding. However, the present disclosure is not limited to this example, and the initial current application may be omitted in the case where a sufficient melting amount of the aluminum sheet materials W1, W2 can be produced by the main current application alone.

In the above embodiment, when the aluminum sheet materials W1, W2 have not melted to the predetermined target melting amount despite the current application time in the main welding having reached the predetermined time (the set welding end time in the master pattern), the prolongation process of continuing the main current application is performed. However, the resent disclosure is not limited to this example, and in the above case, the main welding may be forcibly ended and an alarm signal may be output without the prolongation process being performed.

When the weld quality has been secured before the set welding end time T2 is reached, the main welding may be ended without waiting until the set welding end time T2.

When it is determined that expulsion has occurred, the main welding may be immediately ended without the welding conditions being changed to the expulsion-response welding conditions.

When expulsion has occurred, the master patterns registered in the master pattern registration unit 105 may not be appropriate. With this likelihood taken into account, master patterns may be re-registered in accordance with corrections to the welding conditions made in step ST11 (corrections to the welding conditions for preventing expulsion).

The present disclosure is applicable to resistance spot welding in which preliminary current application is executed and then main welding is executed in accordance with master patterns of various parameters obtained during the preliminary current application.

What is claimed is:

1. A resistance spot welding method in which a workpiece formed by a plurality of metal sheets placed on top of one another is held between a pair of electrodes, and the metal sheets are melted and joined together by applying a current between the electrodes, the resistance spot welding method comprising:
    acquiring information on the workpiece, and executing preliminary current application under a welding condition that is set based on the information;
    measuring an execution state during the preliminary current application, and based on the execution state, setting a master pattern of a welding condition for main welding;
    executing the main welding under the welding condition of the master pattern, and when a current application time in the main welding is within a predetermined time, determining whether a welding abnormality has occurred;
    when the welding abnormality has not occurred, determining whether the welding abnormality is likely to occur;

when the welding abnormality is likely to occur, continuing current application after correcting the welding condition for the main welding so as to prevent the welding abnormality;

when the welding abnormality is unlikely to occur, continuing current application after correcting the welding condition for the main welding so as to match the master pattern; and when the welding abnormality has occurred, changing the welding condition for the main welding to a preset abnormality-response welding condition, and notifying occurrence of the welding abnormality.

2. The resistance spot welding method according to claim 1, wherein, during execution of the main welding, whether a melting amount of the metal sheets has reached a predetermined amount as a target is determined, and when the melting amount of the metal sheets has not reached the predetermined amount at a point in time when the current application time in the main welding has reached a set welding end time in the master pattern, a welding prolongation process of continuing current application in the main welding is performed.

3. The resistance spot welding method according to claim 2, wherein when the melting amount of the metal sheets has not reached the predetermined amount at a point in time when the current application time in the main welding has reached a predetermined time beyond the set welding end time, the main welding is forcibly ended and occurrence of the welding abnormality is notified.

4. The resistance spot welding method according to claim 1, wherein the execution state during the preliminary current application is a pressure applied by the electrodes to the workpiece, an electrode displacement between the electrodes, and an electrical resistance between the electrodes.

5. The resistance spot welding method according to claim 4, wherein:
the welding abnormality is expulsion occurring during the welding;
when the pressure is below an expulsion-determining threshold value, or when the electrode displacement is above an expulsion-determining threshold value, or when the electrical resistance is above an expulsion-determining threshold value, it is determined that the welding abnormality has occurred; and
when the pressure is below an expulsion likelihood-determining threshold value, or when the electrode displacement is above an expulsion likelihood-determining threshold value, or when the electrical resistance is above an expulsion likelihood-determining threshold value, it is determined that the welding abnormality is likely to occur.

6. A resistance spot welding apparatus that has a pair of electrodes between which a workpiece formed by a plurality of metal sheets placed on top of one another is held, and that melts and joins together the metal sheets by applying a current between the electrodes holding the workpiece, the resistance spot welding apparatus comprising:
a control device configured to acquire information on the workpiece, and to execute preliminary current application under a welding condition that is set based on the information on the workpiece;
a measurement device configured to measure an execution state during the preliminary current application; and
a notification device configured to notify occurrence of a welding abnormality when the welding abnormality has occurred,
wherein the control device registers a master pattern of a welding condition for main welding based on the execution state measured by the measurement device, and executes the main welding under the welding condition of the master pattern, and
wherein the control device measures a current application time in the main welding, and when the current application time in the main welding is within a predetermined time, determines whether the welding abnormality has occurred and whether the welding abnormality is likely to occur, and when the welding abnormality is likely to occur, corrects the welding condition for the main welding so as to prevent the welding abnormality, and when the welding abnormality is unlikely to occur, corrects the welding condition for the main welding so as to match the master pattern, and when the welding abnormality has occurred, changes the welding condition for the main welding to a preset abnormality-response welding condition.

7. The resistance spot welding apparatus according to claim 6, wherein:
the measurement device includes an applied pressure measurement device configured to measure a pressure applied by the electrodes to the workpiece, an electrode displacement measurement device configured to measure an electrode displacement between the electrodes, a voltage measurement device configured to measure a voltage across the electrodes, and a current measurement device configured to measure a welding current flowing between the electrodes; and
the execution state during the preliminary current application is the pressure, the electrode displacement, and an electrical resistance between the electrodes that is calculated based on the voltage and the welding current, during execution of the preliminary current application.

8. The resistance spot welding apparatus according to claim 7, wherein:
the welding abnormality is expulsion occurring during the welding;
when the pressure is below an expulsion-determining threshold value, or when the electrode displacement is above an expulsion-determining threshold value, or when the electrical resistance is above an expulsion-determining threshold value, the control device determines that the welding abnormality has occurred; and
when the pressure is below an expulsion likelihood-determining threshold value, or when the electrode displacement is above an expulsion likelihood-determining threshold value, or when the electrical resistance is above an expulsion likelihood-determining threshold value, the control device determines that the welding abnormality is likely to occur.

* * * * *